W. H. PERKINS.
PIPE COUPLING.
APPLICATION FILED JULY 19, 1913.

1,106,967.

Patented Aug. 11, 191

WITNESSES:
H. T. Delaney
L. S. Schessinger

INVENTOR
Walter H. Perkins
BY Harry D. Wallace
ATTORNEY.

UNITED STATES PATENT OFFICE.

WALTER H. PERKINS, OF WATERTOWN, NEW YORK, ASSIGNOR TO J. B. WISE, INC., OF WATERTOWN, NEW YORK, A CORPORATION OF NEW YORK.

PIPE-COUPLING.

1,106,967.

Specification of Letters Patent.

Patented Aug. 11, 1914.

Application filed July 19, 1913. Serial No. 779,928.

*To all whom it may concern:*

Be it known that I, WALTER H. PERKINS, a citizen of the United States, residing at Watertown, in the county of Jefferson and State of New York, have invented certain new and useful Improvements in Pipe-Couplings, of which the following is a specification.

My invention relates to improvements in supply-pipe couplings, designed for use in connection with the hot and cold water parts of bath tubs, lavatories and the like, and has for its object to provide pipes suitable for the purpose, which are arranged with flaring mouths in the ends facing the faucets or cocks, for engaging the usual gland-nuts, by means of which the pipes are secured in place.

A further object is to provide lead or similar compressible bushings or packings for sealing the joints between the pipes and the cocks, the said bushings comprising cone-shaped parts capable of being compressed and molded to conform to the interior of the coupling, and in one face of which the discharge ends of the supply pipes are embedded for preventing leakage.

I attain these objects by the means described in the annexed specification, and illustrated in the accompanying drawing, in which—

Figure 1:
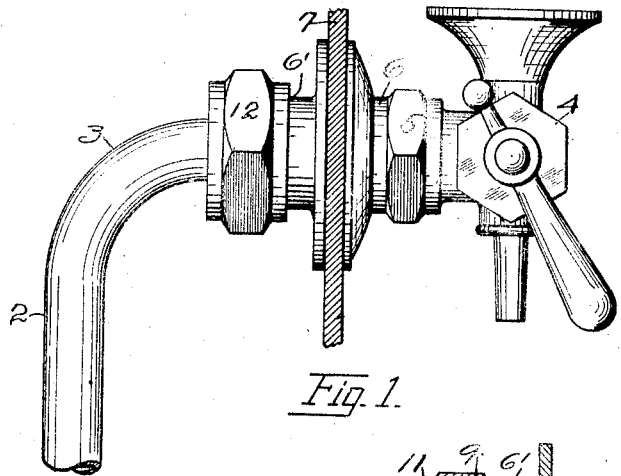
Figure 2:
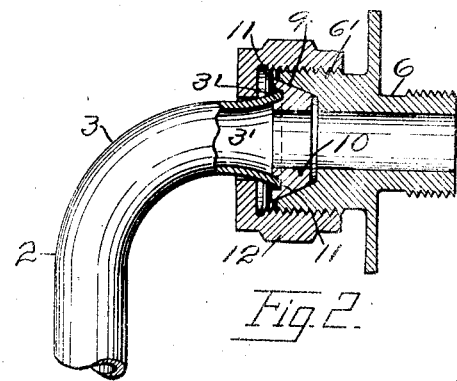
Figures 3, 4, 5, 6:
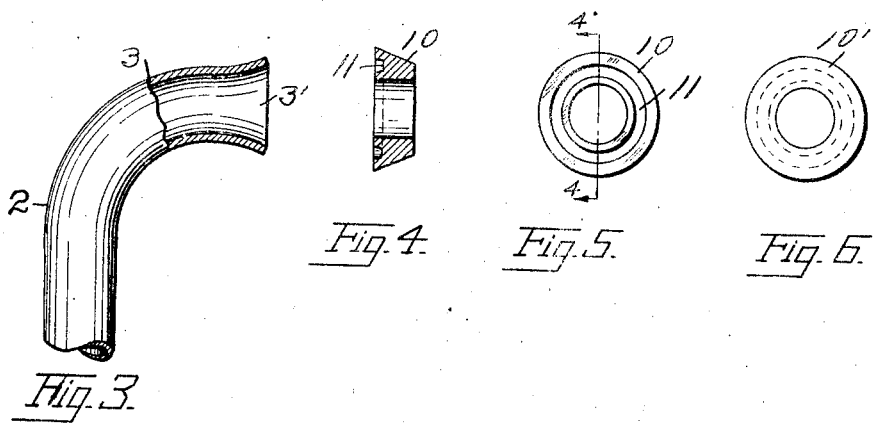

Figure 1 is a side elevation; showing one of the supply pipes applied to an ordinary bath faucet. Fig. 2 is a sectional view; showing the parts assembled in service position. Fig. 3 is a side view of the supply pipe. Fig. 4 is a sectional view, taken on line 4—4 of Fig. 5; showing the construction and arrangement of the lead bushing or packing. Fig. 5 is a front face view of the same. Fig. 6 is a view of a modified form of the packing, the groove being omitted.

In the drawing, 2 represents the supply-pipe or tube employed for conducting either hot or cold water to the faucet or cock of a bath-tub, lavatory or sink, which may consist of any suitable material. The pipe 2, as a rule, is disposed vertically, and in order to reach and connect with the cock, its upper end is preferably bent, as at 3.

4 represents a bath faucet of common construction, which is connected by means of a gland-nut 5 to a coupling 6, which pierces the bath tub 7, and this coupling is arranged with a threaded hub 6', the outer end of which is bored out to form a funnel-shaped socket or seat 9, to receive the flaring or bell mouth 3' of the member 2.

10 represents a cone-shaped bushing or packing which is bored out centrally to provide a concentric passage for the water from the pipe 2 into the coupling member 6. The cone-shaped ring 10, in its preferred form, is provided with an annular groove 11, in its outer or broader face, which receives the flaring mouth 3' of the pipe 2, when the parts are assembled, as shown in Fig. 2.

12 represents a gland-nut which slips over the pipe 2 and engages the bell 3' of said pipe, and when the said nut is screwed on to the threaded hub 6', and tightened up, it forces the bell 3' of the pipe into the groove 11 of the packing 10. Then as the pressure of said nut is increased, the said packing is crowded tightly into the cone-seat 9, and thus prevents the leakage of water between the coupling and the packing, as well as between the packing and the bell 3' of the pipe. The part 10 preferably consists of soft black lead, which is capable of being crowded and tightly pressed into the seat, and whether or not the latter is perfectly and smoothly finished, the lead 10 will effectually seal the joint. The lead bushing 10 being soft, as described, also permits the impressing and embedding of the bell-shaped mouth of the pipe 2 into its outer face, and thus effectually seals the joint between said pipe and the lead connection.

My fitting is extremely simple and novel and it is also strong and may be produced and applied at slight expense. The fitting will stand considerable wear and abuse and not get out of order. From practical tests, my pipe coupling has been found to be superior and more reliable for effecting water tight joints than any other fitting of the class known to me. By the employment of the lead bushing or packing 10, herein shown and described, it is impossible for the mouth 3' of the supply pipe to come into contact with the metal of the coupling 6, which has heretofore been a fault common to the older fittings of the class.

It is obvious that the lead bushing may be constructed without the groove 11, as shown in the modified view in Fig. 6, and that some changes or modifications may otherwise be made in the form and arrangement of the parts, within the scope defined by the appended claims, without departing from the spirit of my invention.

Having thus described my invention, what I claim as new and desire to secure by Letters Patent, is—

1. In a pipe joint, a rigid coupling having a funnel-shaped socket, a cone-shaped compressible bushing disposed in said socket, a supply pipe having a bell mouth engaging and embedded in the end of said bushing for sealing the joint between said pipe and said coupling, and a gland-nut engaging the bell of the supply pipe and also said coupling for drawing and holding said parts together.

2. A pipe coupling, comprising a member having a funnel-shaped socket and screw-threads surrounding said socket, a second member having a flaring mouth facing the larger end of said socket, a soft metallic packing comprising a cone-shaped ring inserted in said socket ahead of said flaring mouth, and a gland-nut for drawing and holding said members together, and for embedding the mouth of said second member in said ring.

3. In a water supply connection, a faucet, a coupling connected at one end to the faucet, the opposite end of said coupling having a funnel-shaped seat, a supply-pipe having a flaring mouth facing the said seat, and a conical bushing disposed in said seat, between the flaring mouth of said pipe and said coupling, said bushing adapted to be forced and molded into said seat having an annular groove to receive and to envelop the mouth of said pipe for sealing the joint.

4. In a bath fixture, a coupling for supporting a faucet, the said coupling piercing the bath tub and forming a conductor for water to the said faucet, said coupling having a socket facing away from the faucet, a supply-pipe carrying water to the said coupling, said pipe having a flaring mouth disposed in the socket in said coupling, and a bushing interposed between the mouth of said pipe and the wall of said socket, said bushing consisting of a material capable of being pressed and molded to conform to the said socket said bushing having an annular groove to receive the mouth of the supply pipe for holding said mouth concentric to said socket.

In testimony whereof I affix my signature in presence of two witnesses.

WALTER H. PERKINS.

Witnesses:
L. C. MITCHELL,
HARRY DE WALLACE.